United States Patent

[11] 3,573,880

| [72] | Inventor | Yasuyuki Sakai<br>Tokyo, Japan |
|---|---|---|
| [21] | Appl. No. | 768,639 |
| [22] | Filed | Oct. 18, 1968 |
| [45] | Patented | Apr. 6, 1971 |
| [73] | Assignee | Nissan Jidosha Kabushiki Kaisha<br>Kanagawa-Ken, Japan |
| [32] | Priority | Oct. 18, 1967 |
| [33] | | Japan |
| [31] | | 42/69260, 42/69261 and 42/91270 |

[54] FRONT WHEEL SUSPENSION FOR MOTOR VEHICLE
15 Claims, 15 Drawing Figs.

[52] U.S. Cl. ...................................... 280/96.2, 267/60
[51] Int. Cl. ...................................... B60g 3/06, B60g 15/06
[50] Field of Search .......................................... 267/20 (A), 60; 280/96.2, 124

[56] References Cited
UNITED STATES PATENTS

| 2,660,449 | 11/1953 | MacPherson | 280/96.2 |
| 3,279,782 | 10/1966 | Schick | 280/96.2X |
| 3,346,272 | 10/1967 | Smith | 280/96.2 |

*Primary Examiner*—A. Harry Levy
*Attorney*—Robillard & Byrne

ABSTRACT: An improvement in a strut-type suspension for motor vehicle having a coil spring placed about a cylinder and piston assembly, wherein the lower end of the coil spring and a spring seat rotate eccentrically around the cylinder and piston assembly when the vehicle is steered. The coil spring is pressed onto the vehicle frame at the upper end thereof and on the spring seat at the lower end thereof, and the cylinder and piston rod assembly extends eccentrically through said coil spring. The spring is provided for supporting said coil spring. Said seat being mounted on said cylinder and piston for eccentric rotation about said assembly.

INVENTOR
YASUYUKI SAKAI

INVENTOR
YASUYUKI SAKAI

BY Robellard and Byrne
ATTORNEYS

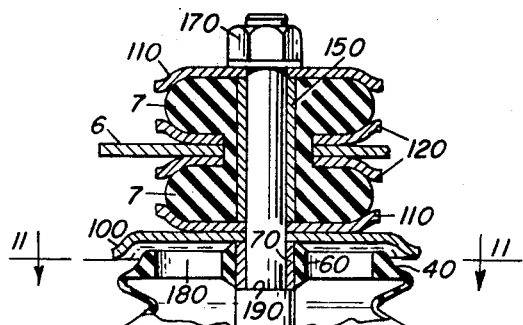
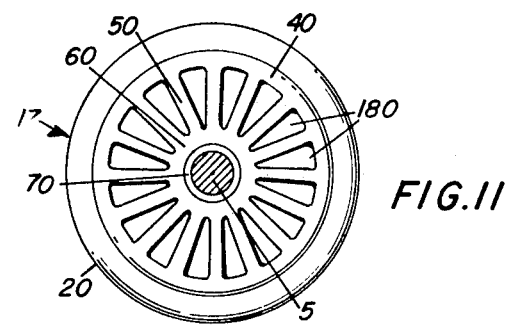
FIG.10
FIG.11
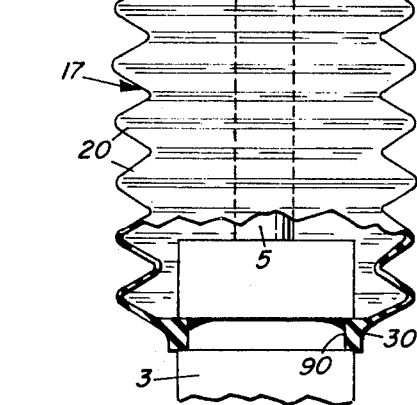
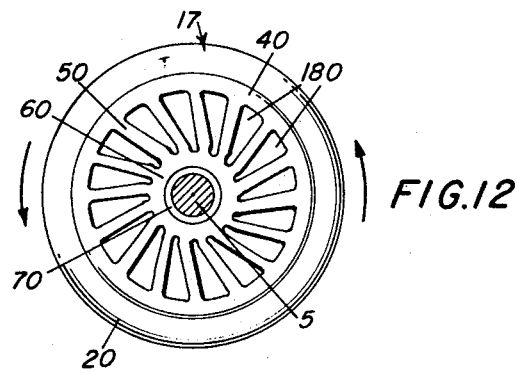
FIG.12
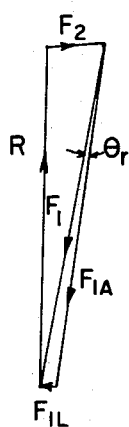
FIG.13
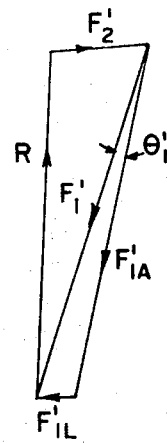
FIG.14
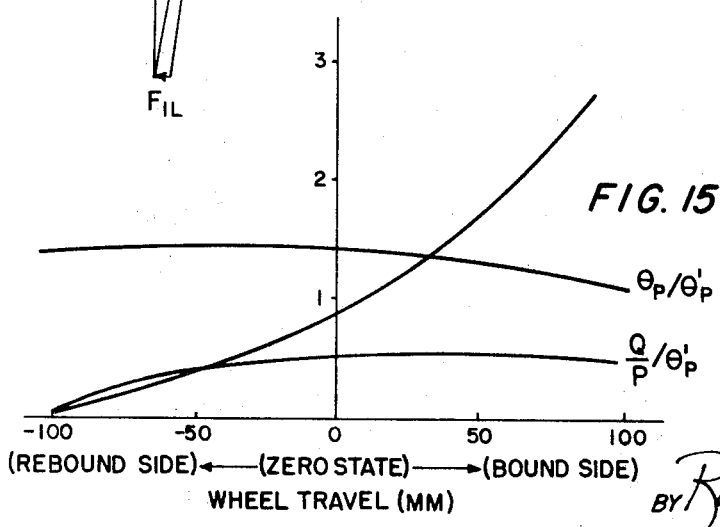
FIG.15
INVENTOR
YASUYUKI SAKAI
BY Robillard and Byrne
ATTORNEYS

FRONT WHEEL SUSPENSION FOR MOTOR VEHICLE

This invention relates to an improvement in a strut-type suspension for a motor vehicle.

In the prior art, a coil spring is secured concentrically to a cylinder and piston rod assembly. The upper end of the coil spring is fixed to the upper portion of the piston rod by means of an upper spring seat. Accordingly it is necessary to provide some gap or clearance between the spring seat and vehicle frame body for avoiding undesirable contact between the two. Furthermore, in sliding portions either between the piston and the inner wall of the cylinder or between the piston rod and a piston rod guide bearing, friction between the portions accompanies the relative vertical movement between the wheel and the vehicle body. The friction is undesirable not only for smooth vertical movement but it greatly decreases the riding comfort. Further, the portions tend to wear out at a faster rate. Therefore, in order to overcome these objectionable aspects the coupling member between the piston rod and the vehicle body must be given more flexibility and at the same time the gap or clearance between the spring seat and the vehicle frame must be made larger. Thus, the height of a fender or hood in front of the vehicle must be increased to the extent that the appearance of the vehicle becomes undesirably affected and the scope of vision of the driver is limited. This is also an undesirable problem from the standpoint of safe driving.

One of the objects of the present invention, therefore, is to provide a novel mechanism in which the upper spring seat in contact with the upper end of a coil spring can be eliminated. Another object of the present invention is to provide a suspension mechanism in which the upper end of the coil spring is in direct contact with the vehicle frame. Another object of the present invention is to completely eliminate the gap or clearance between the upper end of the coil spring and the vehicle frame that existed in the prior art construction. Another object of the present invention is to reduce the height of a fender or hood by completely eliminating the gap or clearance. Another object of the present invention is to provide a more aesthetic front appearance of a motor vehicle by reducing the height of a fender or hood of the vehicle. Another object of the present invention is to insure greater scope of vision of a driver by reducing the height of a fender or hood. Another object of the present invention is to secure the coil spring eccentrically with respect to the cylinder and piston assembly and outwardly with respect to the center of the longitudinal axis of the vehicle. Another object of the present invention is to secure the cylinder to a bracket having a hole. Another object of the present invention is to support the lower end of the coil spring by means of a spring seat having at the center portion thereof a pin adapted to fit into a hole of a bracket attached to said cylinder. An arcuate aperture is provided in the seat through which the cylinder extends. A modification includes substituting a ball and socket for the pin-and-hole arrangement. Another object of the present invention is to permit the eccentric rotation of the spring seat with respect to the cylinder since the upper end of the coil spring is in direct contact with the vehicle frame portion while the lower end thereof is fixed to the seat which is free to rotate as mentioned. Another object of the present invention is to reduce the lateral load acting upon the piston rod by the eccentric deflection of the coil spring. Another object of the present invention is to reduce the friction at the respective sliding portions either between the piston and the inner wall of the cylinder or between the piston rod and the rod guide bearing by reducing the lateral load acting upon the piston rod. Reduction of friction promotes a smoother and quieter ride and increases the life of the various parts. Further, the flexibility of the parts is increased.

Another object of the present invention is to provide a simpler and lighter strut-type suspension with fewer components. Another object of the present invention is to provide a boot which is adapted to prevent mud, water, etc. from intruding into the sliding portions of the cylinder and the piston rod assembly. Another object of the present invention is to provide a boot which has no frictional parts and has greater durability. Another object of the present invention is to reduce the steering force necessary to steer the wheels. Another object of the present invention is to increase the effective space for the engine by securing the coil spring eccentrically with respect to the cylinder and outwardly with respect to the longitudinal axis of the vehicle. The above and other objects of the present invention will become clearer from the following drawings and detailed description.

FIG. 10 is an enlargement of the boot shown in FIG. 1;

FIG. 11 is a view taken on line 11—11 of FIG. 10;

FIG. 12 is a view similar to FIG. 11 illustrating the boot being twisted about its longitudinal axis and therefore deformed;

FIG. 13 is a diagram illustrating the equilibrium of the loads exerted upon the parts of the present invention;

FIG. 14 is a diagram illustrating the equilibrium of the loads exerted upon the parts of a prior art device; and, FIG. 15 is a graph showing the relation between the load or defection and the wheel travel involving the device of FIG. 3 while the vehicle is being steered.

Figures 1, 2:
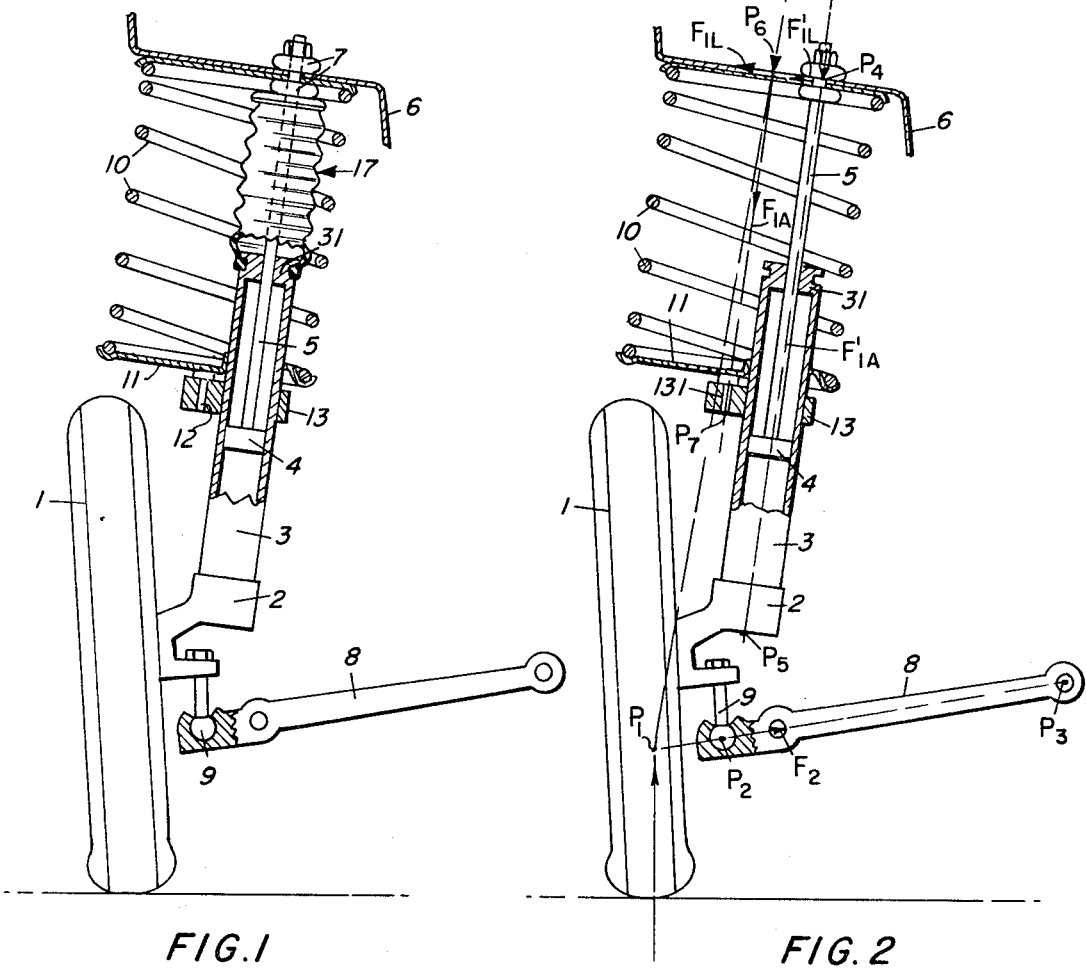
FIG. 1 is a front view, partially in cross section, looking from the front of a vehicle, of a first embodiment of the present invention applied to a right side wheel.
FIG. 2 is a view similar to that of FIG. 1, showing the various axes and minus the boot.

In FIG. 1, reference numeral 1 designates a wheel; 2, a steering knuckle element; 3, a cylinder; 4, a piston; 5, a piston rod; 31, a rod guide bearing; 9, a ball joint; 8, a control link; 13, a bracket fixed to the cylinder; 12, a pin adapted to securely hold the spring seat 11 in position. The spring seat 11 receives the lower end of a coil spring and has an arcuate aperture through which the cylinder extends. A coil spring 10 which, at its upper end, is in direct contact with the vehicle frame portion 6 is disposed eccentrically outwardly of the axis of the cylinder 3 or the piston rod 5. A boot 17 having a bellowslike body portion, at its lower end fitted over the upper end portion of the cylinder 3. The upper end of the boot 17 is fitted to the piston rod 5 and has at its upper surface radially disposed elastic elements extending from the center.

Figure 8:
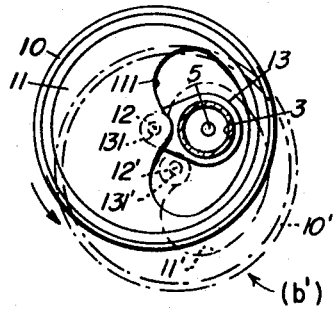
FIG. 8 is a cross-sectional view taken along the line A—A in FIG. 3.

The essential parts of the suspension device of the present invention will be described in details with reference to FIG. 2. FIG. 2 illustrates a strut-type suspension provided with a pin 12 according to the present invention. Reference numeral 1 designates a wheel; 2, a steering knuckle element directly coupled to a spindle (not shown) for supporting the wheel 1 through a bearing (not shown); 3, a cylinder fixed to the steering knuckle 2; 4, a piston, which is adapted to rotatably and slidably move in the cylinder 3; 5, a piston rod whose lower end is coupled to the piston 4, and which is adapted to rotatably and slidably move in a rod guide bearing 31 coupled to the upper end of the cylinder 3. The upper end of the piston rod 5 is received through a rubber cushion 7 in the vehicle frame portion 6. A control link 8 is secured transversely and pivoted to the vehicle body at an inner end $P_3$ for rotating about the longitudinal axis of the vehicle. The other end $P_2$ forms a part of a ball joint. A ball stud 9 of the ball joint is fixed to the steering knuckle 2 in such a manner that the steering knuckle and the control link can rotate about the center of the ball joint. The intersection of the extension of a straight line connecting both ends $P_2$ and $P_3$ of the control link 8 with the perpendicular line passing through the point of the ground contact of the wheel is the point $P_1$. A coil spring 10 is secured eccentrically outwardly with respect to the cylinder 3. The upper end of the spring 10 is in contact with the vehicle frame portion 6 directly or through a rubber sheet, while the lower end is received by a spring seat 11. The spring seat 11 is at its center fixed to a pin 12 whose center axis is parallel or substantially parallel with the center axis of the cylinder 3. The pin 12 is fitted into a hole 131 provided in the outwardly extending portion of bracket 13 fixed to the cylinder 3. As shown in Fig. 8, an arcuate aperture 111 is provided in the spring seat 11 with the cylinder 3 extending through this arcuate aperture.

Figures 3, 4:
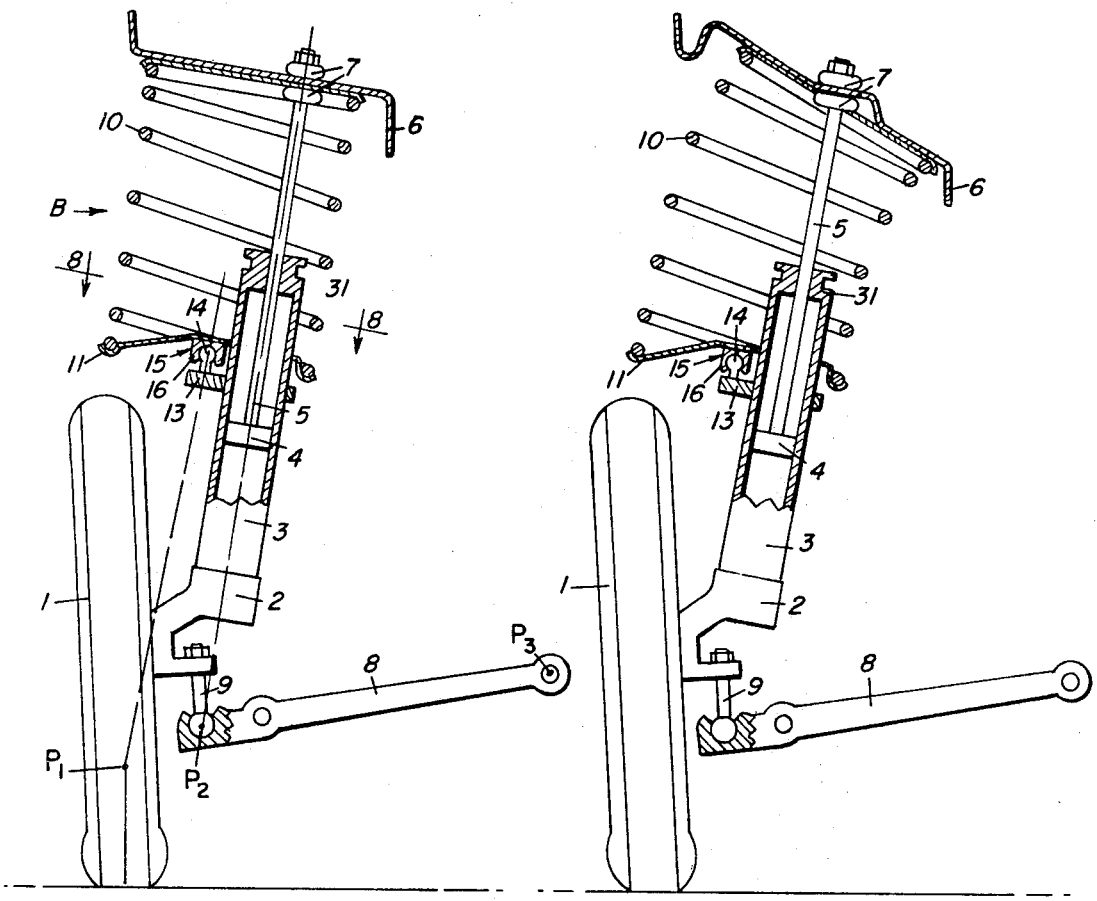
FIG. 3 is a front view, partially in cross section, looking from the front of a vehicle, of a second embodiment of the present invention applied to a right side wheel.
FIG. 4 is a view similar to FIG. 3 with the coil spring being curved.

Referring to FIG. 3, a strut-type suspension provided with a ball joint will be described hereinafter. Reference numeral 1 designates a wheel; 2, a steering knuckle element directly coupled to a spindle (not shown); 3, a cylinder fixed to the steering knuckle 2; 4, a piston, which is adapted to rotatably and slidably move in the cylinder 3; 5, a piston rod, whose lower end is coupled to the piston 4, which rod is adapted to rotatably and slidably move in a rod guide bearing 31 coupled to the upper end of the cylinder 3. The upper end of the piston rod 5 is received directly or through a rubber cushion by the vehicle frame portion 6. A control link 8 is secured transversely and pivoted to the vehicle body at an inner end $P_3$ for rotating about the longitudinal axis of the vehicle, while the other end $P_2$ forms a part of a ball joint. A ball stud 9 of the ball joint is fixed to the steering knuckle 2 in such a manner that the steering knuckle and the control link can rotate about the center of the ball joint. The intersection of a straight line connecting both ends $P_2$ and $P_3$ of the control link 8 with the perpendicular line passing through the point of the ground contact of the wheel is the point $P_1$. A coil spring 10 is secured eccentrically outwardly with respect to the cylinder 3, with the upper end in contact with the vehicle frame portion 6 directly or through a rubber sheet, while the lower end is received by a spring seat 21. The spring seat 11 is at its center fixed to a ball seat 16. The ball seat 16 is adapted to receive a ball stud 14 provided in the outwardly extending portion of the bracket 13 fixed to the cylinder 3, so that a ball joint generally indicated by 15 in its entirety is constructed. The spring seat 11 is adapted to rotate and tilt about the center of the ball joint 15. As best shown in FIG. 8, an arcuate aperture is provided in the spring seat 11 for receiving the cylinder 3.

Now reference is made to FIG. 10 in which a boot generally indicated by 17 is illustrated. The boot 17 has a bellowslike body and a lower annular band 30 which is press-fitted into and securely retained by a groove 90 provided in a shock absorber or the cylinder of the strut assembly. An upper annular band 40 is provided at the upper peripheral end of the bellows portion. Between the upper annular band 40 and an annular mounting band 60 which is directly welded to an inner metallic cylinder 70 secured inwardly of the annular band 40, a suitable number of elastic elements 50 whose width is wider in the axial direction of the boot 17 as shown in FIG. 11 are radially disposed and integrally molded. A cover 100 is provided for preventing mud, water, etc. from intruding into the boot through sector-shaped air inlet-outlets 180 shown in FIG. 11. Washers 120 are welded to the respective upper and lower sides of the vehicle frame portion 6, each of which receive a rubber cushion 7 and are supported by another washer 110. Between these washers 110 and a ferrule 150 is fitted over the reduced diameter portion of the piston rod 5. The ferrule 150 and the inner cylinder 70 are secured in position between the stepped portion 190 of the piston rod 5 and the nut 170 fixed to the upper end thereof. When both the cylinder 3 and the piston rod 5 move relatively in the axial direction, the bellows of the boot 17 is caused to expand and contract so that the air within the boot is sucked into or discharged out of the boot 17 through the sector-shaped air inlet-outlets 180. When the cylinder 3 slidably rotates with respect to the piston rod 5, the bellows 20 is not subjected to the torsional deformation, but is rotated together with the cylinder 3, so that the elastic elements 50 are bent and expanded as shown in FIG. 12, thereby permitting the torsion or twist of the boot 17 between the upper and lower mounting portions thereof. In view of the cost, endurance, practical use, etc., the best result and effect can be obtained when the aforementioned boot and the elements are made of rubber.

Next, the mode of operation of a suspension provided with a pin 12 according to the present invention will be described with reference to FIG. 2. When the wheel 1 is caused to move upwardly or downwardly with respect to the vehicle body depending upon the roughness of the ground surface, the steering knuckle 2, the cylinder 3, the pin 12 supported by the bracket 13, the spring seat 11 fixed to the bracket and the ball stud 9 are moved upwardly or downwardly together with the wheel. In this case, the piston rod 5 which is supported at the point $P_4$ by the vehicle frame portion 6 and the piston 4 which is fixed to the piston rod 5 are not moved while the cylinder 3 slides relative thereto. A damper valve (not shown) is secured within the cylinder 3 cooperating with the sliding movement of the piston 4. Therefore, a damping force is produced, damping out the vertical movement of the wheel and the vehicle body. The control link 8 is caused to rotate about the point $P_3$, responsive to the universal movement at $P_2$. The coil spring 10 which is interposed between the vehicle frame portion 6 and the spring seat 11 is expanded or compressed so as to assist in producing the damping action.

The mode of operation of a suspension provided with a ball joint according to the present invention will be described with reference to FIG. 3. Upon the vertical movement of the wheel 1 depending upon the roughness of the ground, the steering knuckle 2, the cylinder 3, the bracket 13, the ball stud 14 is fixed to the bracket 13, the ball seat 16 supported by the ball stud 14, the spring seat 11 fixed to the ball stud 14 and the ball stud 9 fixed to the steering knuckle 2 are all caused to move together vertically with the wheel 1. In this case, the piston rod 5 is fixed to the vehicle frame portion 6 at the point $P_4$ and the piston 4 fixed to the piston rod 5 are not moved while the cylinder 3 slides relative thereto. A damper valve (not shown) is disposed within the piston 4 so as to permit the flow of the hydraulic oil within the cylinder 3 responsive to the sliding movement of the piston 4. Therefore, a damping force is produced, thereby damping out the vertical movement of the wheel or the vertical movement of the wheel or the vertical movement of the vehicle body accompanied with that of the wheels. The control link 8 is rotated or rocked about the point $P_2$ responsive to the universal movement at $P_2$. The coil spring 10 which is interposed between the vehicle frame portion 6 and the spring seat 11 is expanded or compressed so as to assist in producing the damping action.

Figure 9:
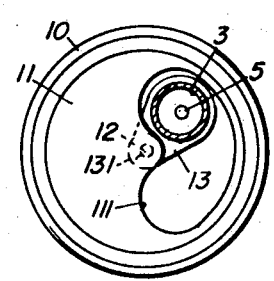
FIG. 9 is a similar view to FIG. 8 illustrating the state indicated by $b'$ in FIG. 8.

When the suspension provided with a pin 12 according to the present invention is steered, the wheel 1, the steering knuckle 2, the cylinder 3, the bracket 13 and the ball stud 9 are all rotated about the axis connecting the points $P_2$ and $P_4$ in FIG. 2. In this case, the piston rod 5 fixed to the vehicle frame portion 6 and the piston 4 fixed to the lower end of the piston rod 5 are not rotated so that the cylinder 3 slidably and rotatably moves relative to the piston 4 and piston rod 5. In this case the coil spring 10 is not rotated but is twisted about its longitudinal axis because the upper end thereof is fixed to the vehicle frame portion 6 and the spring seat 11 is movable eccentrically relative to the cylinder by means of the arcuate slot 11 and pin 12 arrangement. The spring seat 11 which is in contact with the lower end of the coil spring 10 and which at its center portion is fixed to the pin 12 is caused to rotate eccentrically of the cylinder axis since the coil spring 10 is fixed at its top portion and therefore is subjected to sheer as the bracket is rotated. The pin 12 is caused to rotate within the hole 131 of the bracket 13. The relation between the spring seat 11 and the cylinder 3 which extends through the arcuate aperture 111 is shown in FIG. 9.

Figure 7:
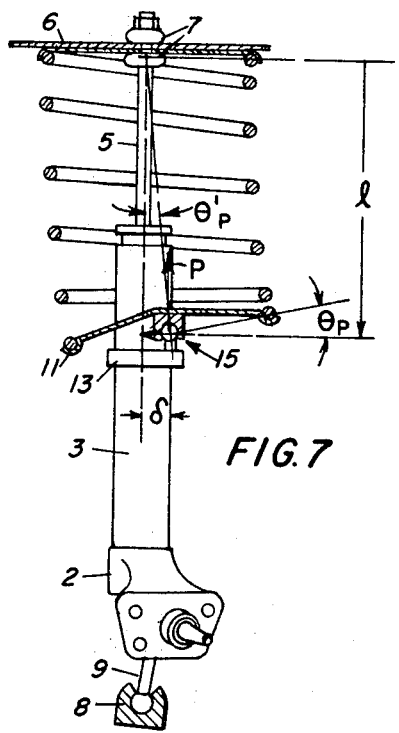
FIG. 7 is a side view of the device shown in FIG. 3 looking in the direction of the arrow B in FIG. 3.

When the suspension provided with the ball joint 15 of FIG. 3 is used, the wheel 1, the steering knuckle 2, the cylinder 3, the bracket 13, the ball stud 14 fixed to the bracket 13 and the ball stud 9 fixed to the steering knuckle 2 are all rotated about the axis connecting the point $P_2$ and $P_4$ in FIG. 3 when the vehicle is steered. In this case the piston rod 5 supported by the vehicle frame portion 6 and the piston 4 fixed to the lower end of the piston rod 5 are not rotated so that the cylinder 3 slidably and rotatably moves relative to the piston rod 5 and piston 4. Since the upper end of the coil spring 10 is fixed to the vehicle frame portion 6, the coil spring 10 is not rotated but is twisted due to the rotation of the bracket 13 about the cylinder axis caused by the rotation of the cylinder 3. Therefore, the spring seat 11 which is in contact with the lower end of the coil spring 10 is caused to rotate eccentrically of the cylinder axis when the bracket 13 and the spring seat 11 are rotated at the center of the ball joint 15. The relation between the spring seat 11 and the cylinder which extends through the arcuate aperture 111 is shown in FIG. 9. In this state, as shown in FIG. 7, the center of the lower end of the coil spring is caused to be deflected by $\delta$ with respect to the perpendicular from the center of the upper end of the coil spring 10. The angle of inclination of the spring seat $\theta_p$ with respect to the deflection $\delta$ or the direct function $\theta_p' = \tan \delta/l$. the lateral load $Q$ acting upon the spring seat from the coil spring, the ratio of the lateral load $Q$ to the vertical load $P$ are all proportional with respect to the deflection $\delta$ or $\theta_p'$. The coefficient of proportion varies depending upon the effective length $l$ of the coil spring or the wheel travel. One example of the relation among them is shown in FIG. 15. A problem exists when the ball joint 15 is used for supporting the spring seat in that there is a tendency for the coil spring to buckle. The radius of the coil spring must be enlarged essentially since the cylinder and the ball joint are secured within the radius of the coil spring, so that it is possible to obtain a safety factor sufficient enough to encounter the buckling. And as shown in FIG. 15, the angle of inclination $\theta_p$ of the spring seat is about 1.4 times with respect to $\theta_p'$, so that there is no problem in practical use.

Figure 5:
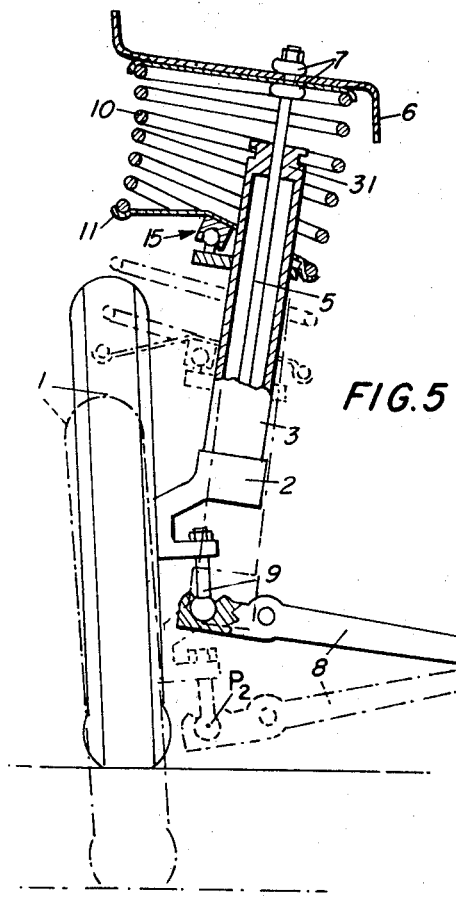
FIG. 5 is a view similar to FIG. 3 illustrating a great load is being applied to the device shown in FIG. 3.
Figure 6:
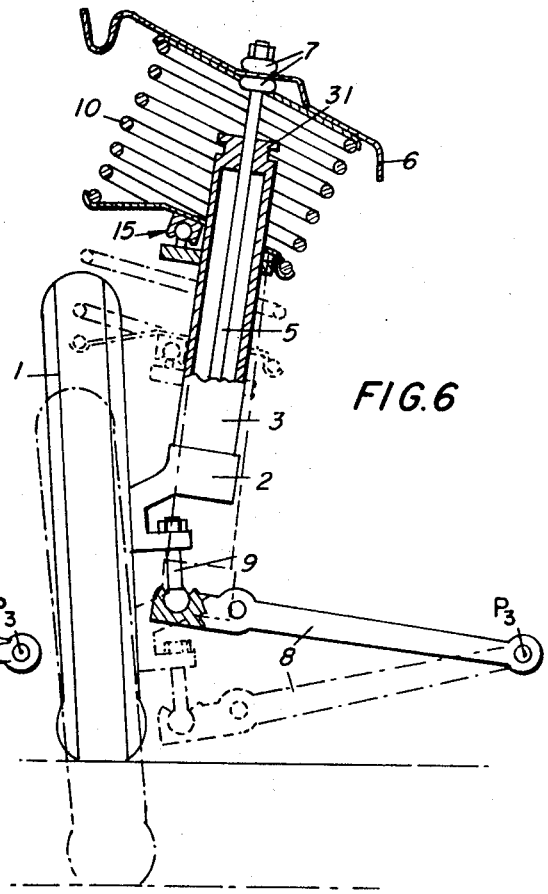
FIG. 6 is a similar view to FIG. 4 illustrating a great load being applied to the device shown in FIG. 4.

In a strut-type suspension according to the present invention, when a high load is applied to the suspension, the coil spring is caused to bend as shown in FIG. 5 so that the windings of the coil spring are in partial contact with each other, thereby producing stress concentration in these contact portions of the coils. Therefore, the endurance of the coil spring will be lessened and the riding comfortability will be undesirably affected. Precisely, the ball joint 9 is caused to move vertically along the circular locus of the point $P_2$ whose center is the point $P_3$ of the control link 8, so that the cylinder 3, the bracket 13, the ball joint 15, the spring seat 11 and the lower end of the coil spring are all caused to move vertically, thereby causing the coil spring to bend and the winding coils to partially contact each other. To solve this problem, as shown in FIG. 4, the upper end of the coil spring is located inwardly of the centerline of the vehicle body so that under normal load condition the coil spring is normally bent and under high load condition the axis of the coil spring becomes perpendicular with respect to the upper end thereof (see FIG. 6). In this manner and by this construction the windings of the coil spring can be prevented from partially contacting each other, thereby providing a suspension of greater durability offering a better riding comfortability. The same effect can be attained by so arranging the suspension provided with the pin 12.

As described above, the characteristic features of the present invention reside in that a coil spring is secured eccentrically outwardly with respect to the center axis of a cylinder and a piston rod assembly; the upper end of the coil spring is in direct contact with the vehicle frame portion 6; a pin 12 fitted into a hole 131 provided in the bracket 13, which is fixed to a cylinder 2 and which extends outwardly from said cylinder. In the alternative to the pin 12 a ball seat being adapted to receive a ball stud may be fixed to said bracket. A spring seat 11 whose center portion is fixed by said ball seat or pin and which is adapted to support the coil spring 10, is permitted to rotate about the axis of said pin or said ball stud relative to the cylinder.

The advantages of these characteristic features will be described hereinafter. In the prior art, a coil spring is secured coaxially of a cylinder or a piston rod. In this case, the equilibrium of the loads acting upon the conventional suspension due to the vertical load acting upon the point of ground contact of a wheel is illustrated in FIG. 14 where $F_1'$ is a reaction force acting from the vehicle body upon the suspension at the point $P_4$ in the direction of the straight line connecting the points $P_1$ and $P_4$, and $F_2'$ is a tensile force acting upon the control link 8. In this case, the reaction force $F_1'$ can be resolved into the load acting in the axial direction of the piston rod, that is the coil spring reaction force $F_{1A}'$ and into the load $F_{1L}'$ acting at the point $P_4$ upon the piston rod perpendicularly with respect to the axis of the piston rod. The lateral load $F_{1L}'$ of the piston rod produces the vertical loads acting upon the sliding portion either between the cylinder and the piston or between the piston rod and the rod guide bearing 31. Therefore, the friction at the sliding portions is accompanied with relative vertical motion between the wheel and the vehicle body. This friction will undesirably affect not only the above described relative vertical motion and the riding comfortability, but also the endurance of the above described sliding contact members. However, according to the present invention the lateral load acting upon the piston rod can be reduced, thereby reducing the friction whereby the smooth operation of the suspension can be ensured increasing the endurance of the suspension and the riding comfortability This remarkable advantage is brought about by the mechanism shown in fig. FIG. 2, wherein the coil spring 10 is mounted eccentrically outwardly with respect to the center axis ($P_4$—$P_5$) of the piston rod 5. In this case, the equilibrium of the loads acting upon the various points of the suspension of the present invention is diagrammatically shown in FIG. 13, where $R$ is the vertical load having the same magnitude as that shown in FIG. 14; $F_1$ is a reaction force acting from the vehicle body upon the suspension in the direction of the straight line connecting the points $P_1$ and $P_6$ which is the point of intersection of the center line of the coil spring (more precisely, the line of action of the load exerted upon the coil spring) and a plane surface passing through the point $P_4$ and being perpendicular with respect to the piston rod; and $F_2$ is a tensile force acting upon the control link 8. The reaction force $F_1$ can be resolved into a coil spring reaction force $F_{1A}$ ($P_6$—$P_7$) and into a load $F_{1L}$ acting upon the piston rod perpendicularly with respect to the axis of the piston rod at $P_4$, which is located on the same line of action including the point $P_6$. It can be seen clearly that the lateral load $F_{1L}$ acting upon the piston rod is smaller than $F_{1L}'$ shown in FIG. 14. The reason is that the angle $\theta_p$ between the line of action of the load $F_1$, that is the straight line connecting the points $P_1$ and $P_6$, and the line of action of the load $F_{1A}$, that is the centerline of the coil spring, in the present invention is smaller than the angle $\theta'_p$ between the line of action of the load $F_1'$, that is the straight line connecting the points $P_1$ and $P_4$, and the line of action of the load $F_{1A}'$, that is the a axis of the cylinder, in the prior art. It is of course possible in the suspension of the present invention to reduce the angle $\theta_p$ to zero, thereby also reducing the lateral load acting upon the piston rod to zero.

Another advantage is obtained by the direct contact of the upper end of the coil spring with the vehicle frame portion since the spring 10 can rotate eccentrically about the axis of the cylinder 3 by means of the pin 12 and the bracket 13 or the ball seat 16 and the ball stud 14. That is, in the prior art, the upper end of the coil spring is fixed with another spring seat to the upper portion of the piston rod independent of the lower seat. In order to prevent the contact between the upper spring seat and the vehicle frame portion, a suitable gap or clearance must be provided therebetween. As to this gap or clearance, more flexibility of the coupling member between the piston rod and the vehicle body is normally given to avoid the uncomfortability of riding due to the large friction at the sliding portions between the piston and the inner wall of the cylinder or between the piston rod and the rod guide bearing. The gap or clearance between the spring seat and the vehicle frame portion must be increased to a considerable extent, meaning that the vehicle fender must be raised. This arrangement is not preferably for the appearance of the vehicle and also for safety since the scope of vision of the driver is decreased. However, according to the present invention, the upper end of the coil spring can be disposed in direct contact with the vehicle frame portion, so that the above discussed clearance or gap can be completely eliminated.

Furthermore, the boot of the present invention has no part or component which is susceptible to abrasion or wear due to the deflection properties of the boot. Moreover, since the friction between the sliding contact portions can be minimized, it is not necessary to increase the flexibility of the coupling member between the piston rod and the vehicle body, so that the suspension can be made compact in size and simple in mechanism, as described in detail hereinbefore. Another advantage of the present invention resides in the fact that the steering force to be applied to the steering wheels can be reduced, thereby greatly saving the labor of a driver since the lateral load Q acting from the coil spring upon the spring seat acts in the direction in which the steering angle is increased when a vehicle is steered. (However, it must be noted here that the steering force will be increased in case of a strut-type suspension provided with a pin since the lateral force acts in the reverse direction.) Another advantage of the present invention is that the strut-type suspension can be fabricated at a very low cost. (However, the cost of a strut-type suspension provided with a pin will become rather higher as compared with that of the suspension provided with a ball joint and more complex in mechanism because it requires a pin having a sufficient strength to withstand the bending moment acting from the coil spring upon the spring seat, and it requires a thrust bearing for receiving the vertical load and a sleeve bearing for receiving the bending moment at the sliding contact portions.

While the invention has been described and illustrated in the form of preferred embodiments, it is intended to cover all modifications and variations which fall within the scope of the appended claims.

I claim:

1. A strut-type suspension for motor vehicles comprising:
   a cylinder and piston assembly;
   means for attaching said cylinder and piston assembly to the vehicle frame at the upper end thereof and to the vehicle wheel at the lower end thereof;
   a coil spring disposed eccentrically about said cylinder and piston assembly and fixed at the upper end thereof to the vehicle frame;
   a spring seat fixed to the lower end of said spring for supporting said spring; and
   means for mounting said spring seat on said cylinder and piston assembly for eccentric rotation about said assembly.

2. The strut-type suspension according to claim 1, wherein said mounting means comprises:
   a bracket fixed to and extending outwardly from said cylinder and piston assembly; and
   a pin rotatably mounted on said bracket and to which said spring seat is attached at the center portion of said seat.

3. The strut-type suspension according to claim 2, wherein said cylinder and piston assembly includes:
   a piston rod connected to said piston and extending coaxially with and outwardly from said cylinder; and
   a boot comprising a bellows like tubular member attached at one end to said cylinder where said piston rod emerges and at the other end to the piston rod, said tubular member having sector-shaped air inlets at said other end.

4. The strut-type suspension according to claim 3, wherein said boot is made of rubber.

5. A strut-type suspension according to claim 2, wherein the center point of the upper end of said coil spring is nearer the axis of said cylinder and piston assembly than that of the lower end of said coil spring, and the longitudinal axis of said assembly is angularly offset relative to the perpendicular to the plane of said frame whereby the longitudinal axis of said spring is bent relative to the axis of said cylinder and piston assembly under the normal preloading weight of the vehicle.

6. The strut-type suspension of claim 5, wherein said cylinder and piston assembly includes:
   a piston rod connected to said piston and extending coaxially with an outwardly from said cylinder; and
   a boot comprising a bellowslike tubular member attached at one end to said cylinder where said piston rod emerges and at the other end to the piston rod, said tubular member having sector-shaped air inlets at said other end.

7. The strut-type suspension according to claim 6, wherein said boot is made of rubber.

8. The strut-type suspension according to claim 1, wherein said mounting means comprises:
   a bracket fixed to and extending outwardly from said cylinder and piston assembly; and
   a ball joint on said bracket connected to said spring seat at the center portion of said seat.

9. The strut-type suspension of claim 8, wherein said cylinder and piston assembly includes:
   a piston rod connected to said piston and extending coaxially with and outwardly from said cylinder; and
   a boot comprising a bellowslike tubular member attached at one end to said cylinder where said piston rod emerges and at the other end to the piston rod, said tubular member having sector-shaped air inlets at said other end.

10. The strut-type suspension according to claim 9, wherein said boot is made of rubber.

11. A strut-type suspension according to claim 8, wherein the center point of the upper end of said coil spring is nearer the axis of said cylinder and piston assembly than that of the lower end of said coil spring, and the longitudinal axis of said assembly is angularly offset relative to the perpendicular to the plane of said frame whereby the longitudinal axis of said spring is bent relative to the axis of said cylinder and piston assembly under the normal preloading weight of the vehicle.

12. The strut-type suspension of claim 11, wherein said cylinder and piston assembly includes:
   a piston rod connected to said piston and extending coaxially with and outwardly from said cylinder; and
   a boot comprising a bellowslike tubular member attached at one end to said cylinder where said piston rod emerges and at the other end to the piston rod, said tubular member having sector-shaped air inlets at said other end.

13. The strut-type suspension according to claim 12, wherein said boot is made of rubber.

14. A The strut-type suspension of claim 1, wherein said cylinder and piston assembly includes:
   a piston rod connected to said piston and extending coaxially with and outwardly from said cylinder; and
   a boot comprising a bellowslike tubular member attached at one end to said cylinder where said piston rod emerges and at the other end to the piston rod, said tubular member having sector-shaped air inlets at said other end.

15. The strut-type suspension according to claim 14, wherein said boot is made of rubber.